United States Patent
Rakshit (10) Patent No.: US 9,077,546 B1
(45) Date of Patent: Jul. 7, 2015

(54) TWO FACTOR VALIDATION AND SECURITY RESPONSE OF SSL CERTIFICATES

(71) Applicant: Samir Kumar Rakshit, Bangalore (IN)

(72) Inventor: Samir Kumar Rakshit, Bangalore (IN)

(73) Assignee: Symnatec Corporation, Mountain View, CA (US)

( * ) Notice: Subject to any disclaimer, the term of this patent is extended or adjusted under 35 U.S.C. 154(b) by 192 days.

(21) Appl. No.: 13/686,382

(22) Filed: Nov. 27, 2012

(51) Int. Cl.
*H04L 9/32* (2006.01)
*H04L 29/06* (2006.01)

(52) U.S. Cl.
CPC ............ *H04L 9/3265* (2013.01); *H04L 63/1416* (2013.01); *H04L 63/0823* (2013.01); *H04L 9/3268* (2013.01)

(58) Field of Classification Search
None
See application file for complete search history.

(56) References Cited

U.S. PATENT DOCUMENTS

| | | | | |
|---|---|---|---|---|
| 7,444,509 | B2 * | 10/2008 | Nadalin et al. | 713/156 |
| 2003/0014629 | A1 * | 1/2003 | Zuccherato | 713/156 |
| 2009/0037997 | A1 * | 2/2009 | Agbabian et al. | 726/10 |
| 2009/0089584 | A1 * | 4/2009 | Bender et al. | 713/176 |
| 2009/0126001 | A1 * | 5/2009 | Krantz et al. | 726/10 |
| 2011/0154026 | A1 * | 6/2011 | Edstrom et al. | 713/158 |

* cited by examiner

*Primary Examiner* — Jung Kim
*Assistant Examiner* — Janusz Kusyk
(74) *Attorney, Agent, or Firm* — Lowenstein Sandler LLP (57) ABSTRACT

Methods and apparatuses for authenticating a secure sockets layer certificate (SSL) certificate are described herein. The methods include receiving the SSL certificate associated with a website, identifying a chain of trust associated with the SSL certificate, transmitting, to a security manager, a validation request based on the SSL certificate and a certificate in the chain of trust, receiving a validation response from the security manager, and presenting an indication of trustworthiness, to a user, based on the validation response. The apparatuses are provided to implement the methods.

13 Claims, 5 Drawing Sheets

| CN 202 | Attributes 204 | Wildcard 206 | Exclusive 208 |
|---|---|---|---|
| Server1.abcbank.com | O, OU, etc. | N | Y |
| *.trustedbanking.net | O, OU, etc. | Y | N |
| . | . | . | . |
| . | . | . | . |
| . | . | . | . |
| Banking.invest.com | O, OU, etc. | N | Y |

TWO FACTOR VALIDATION AND SECURITY RESPONSE OF SSL CERTIFICATES

TECHNICAL FIELD

The embodiments of the disclosure relate generally to computing systems and, more specifically, relate to computing system security.

BACKGROUND

Secure protocols, such as the Secure Sockets Layer (SSL) protocol, are widely used to protect data transmitted on the Internet, such as between a user's application and a web site server. Often, the connection is secured by using a certificate returned from the web site to share a key with the web browser of the user's computing system. In some instances, a user is prompted for input of one or more user credentials, such as a username and password and to validate the authenticity of the server. In other instances, the only user interaction may be to approve the certificate returned from the web site.

The web browser typically checks to see if the signer of the certificate matches a known signer, e.g., a Certificate Authority ("CA"). If the signer of the certificate matches a known signer in the certificate, the web browser allows the connection. If the signer of the certificate does not match a known signer, the web browser typically generates an alarm notification to the user so that the user can determine whether or not to continue the connection. Thus, when a user browses to a website and sees a proper certificate from known signer, i.e. a CA (Certificate Authority), and the browser does not show any alarm message, a user typically assumes that the web site is legitimate and any communication is secure. Unfortunately, some computer attacks utilize a seemingly legitimate certificated by issuing a certificate signed by a compromised CA. As the compromised CA is otherwise trusted by the web browser, the web browser recognizes the certificate to be from a known (legitimate) signer, and the user is not aware that the website is presenting a compromised certificate. Communication with the website appears to be secure, but an attacker can intercept every detail of the communication and also manipulate the data of the communication. This attack is often referred to as a "man-in-the-middle" attack.

SUMMARY OF THE INVENTION

Methods and apparatuses for authenticating a secure sockets layer certificate (SSL) certificate are described herein. The methods include receiving the SSL certificate associated with a website, transmitting, to a security manager, a validation request with the SSL certificate and a certificate in the chain of trust, receiving a validation response from the security manager, and presenting an indication of trustworthiness, to a user, based on the validation response. In one embodiment, the method also includes communicating a notification to the security manager and a user if any illegitimate certificate is detected. The apparatuses are provided to implement the methods.

In one embodiment, the method also includes generating the validation request using a signing certificate that is common to the credential manager application and the security manager. The validation response may be an indication of a legitimate certificate authority associated with the SSL certificate. The method may include notifying the security manager that the SSL certificate is malicious, if the certificate was not issued by an authentic or original certificate authority. The method also includes communicating identifying information to the security manager, the identifying information comprising an IP address of the user, website name, name of illegitimate or compromised CA (certificate authority) signer, and name of valid root certificate authority.

The method further includes notifying the compromised certificate authority recognized in this illegitimate request and the deemed (i.e., the valid and original) certificate authority if the if the certificate in this communication does not match the deemed CA (Certificate Authority) of the chain of trust of the website. Also, the method may include notifying a user if the website certificate is illegitimate.

A computing system is provided to implement the above described method. The computing system, in one example, includes a memory, and a processor coupled with the memory. The processor executes a credential manager that is configured to perform the above described methods.

In addition, a computer readable storage medium for authentication of SSL certificates is described. An exemplary computer readable storage medium provides instructions, which when executed on a processing system causes the processing system to perform a method such as the methods discussed above.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Methods and apparatuses for authenticating a secure sockets layer certificate (SSL) certificate are described herein. The methods include receiving the SSL certificate associated with a website, identifying a chain of trust associated with the SSL certificate, transmitting, to a security manager, a validation request based on the SSL certificate and a certificate in the chain of trust, receiving a validation response from the security manager, and presenting an indication of trustworthiness, to a user, based on the validation response. The apparatuses are provided to implement the methods.

The methods described below beneficially allow a web user to authenticate a chain of trust of an SSL certificate. Previously, if a root certificate authority were compromised, a hacker could generate an SSL certificate that, for all intents and purposes, appears valid. Other than knowing that the malicious SSL certificate has a basis in a compromised root of trust, the user is oblivious to malicious SSL certificate. The methods described below allow a web browser to verify the trustworthiness by requesting, from a trusted certificate authority, the true or authentic root certificate authority for a particular website. Once a response is received, the web browser can determine if the SSL certificate is valid by comparing the root certificate authority of the SSL certificate, received from credential manager, to the true root certificate authority in the security manager response. If there is a mismatch, the SSL certificate is malicious, and the web browser presents an alarm to the user and sends details of such communication to the trusted certificate authority, the website owner, and the compromised certificate authority of the malicious certificate.

In the following description, numerous details are set forth. It will be apparent, however, to one of ordinary skill in the art having the benefit of this disclosure, that embodiments of the present invention may be practiced without these specific details.

Figure 1:
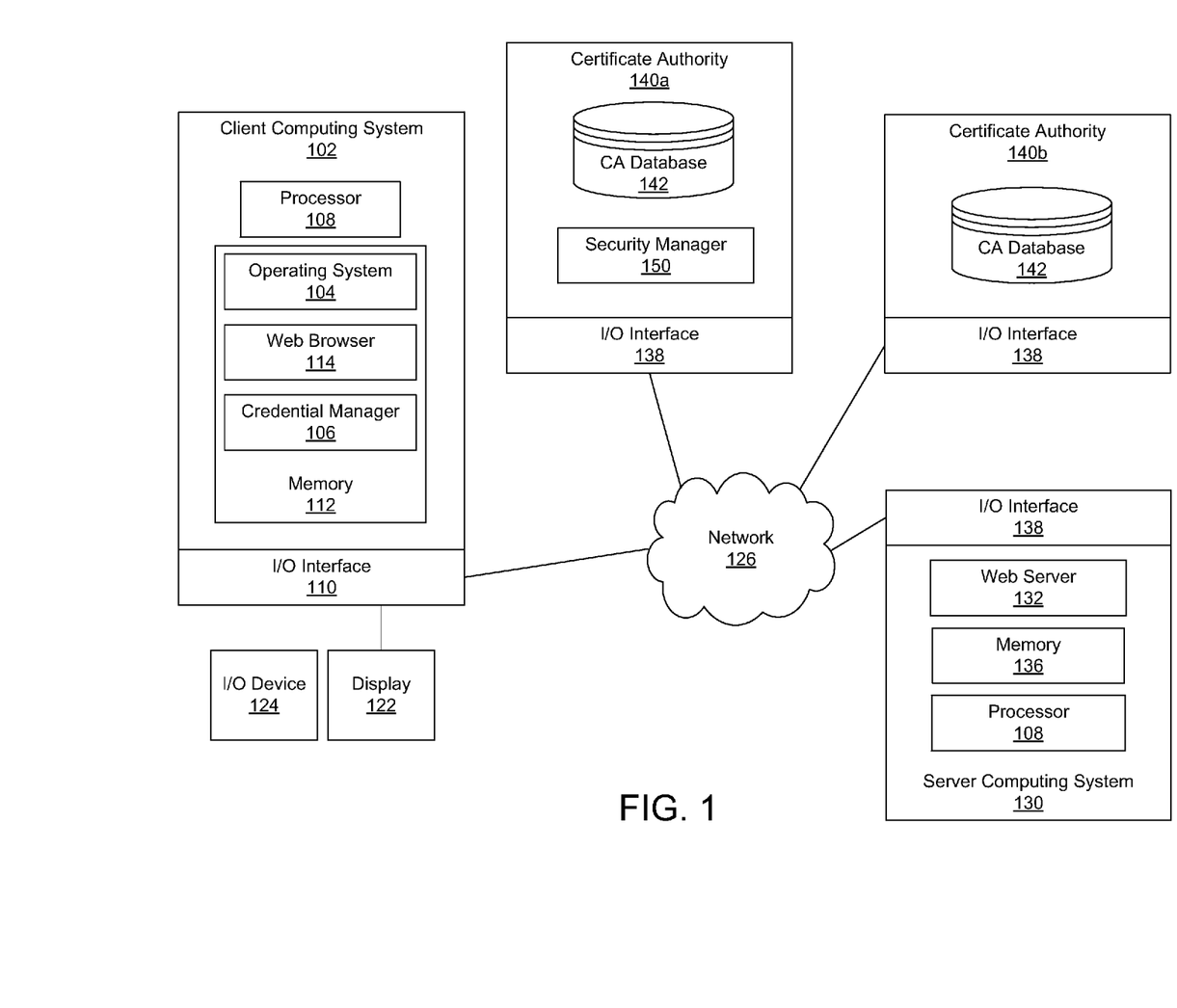
FIG. 1 is a network diagram of a client computing system that includes a credential manager in accordance with one embodiment of the present invention.

FIG. 1 is a network diagram of a client computing system 102 that includes a credential manager 106 in accordance with one embodiment of the present invention. The client computing system, sometimes called a user device, typically includes a central processing unit (CPU) 108, hereinafter processor 108, an input output (I/O) interface 110, a memory 112, and an operating system 104.

The client computing system 102 may further include standard I/O devices 124 like a keyboard, a mouse, a printer, and a display device 122, as well as, other standard input/output (I/O) devices 124, such as a compact disk (CD) or DVD drive, floppy disk drive, or other digital or waveform port for inputting data to and outputting data from the client computing system 102.

In one embodiment, the client computing system 102 is coupled via a network 126 to one or more other computer systems, such as a server computing system 130, and one or more remote trusted sources, such as a remote trusted certificate authority 140 (collectively referred to as certificate authority 140, and individually as certificate authority 140a or certificate authority 140b). The network 126 can be any network or network system that is of interest to a user, including, but not limited to, any local or wide area network. The server computing system 130 may include a web server 132, a processor 134, a memory 136, and a network interface 138.

In one embodiment, the server computing system 130 can be a secure computer system that utilizes a site certificate, such as an SSL certificate to secure web sites that are served by the web server 132. In some embodiments, the server computing system 130 may utilize a fraudulent certificate, such as a fraudulent SSL certificate that corresponds to a fraudulent certificate maliciously installed in a certificate store (not shown) of web browser 114.

In one embodiment, a trusted certificate authority 140 includes remotely stored certificate information corresponding to separate SSL certificates. Thus, the certificate authority 140 includes or has access to a certificate authority database 142 which includes one or more entries, each entry having stored certificate information associated with an SSL certificate. These entries will be described in greater detail below with reference to FIG. 2. In one embodiment, the stored certificate information includes a domain name together with one or more user credentials and/or one or more certificate attributes. In one embodiment, the certificate authority 140 is utilized by the credential manager 106 to provide remotely stored certificate information.

In one embodiment, the memory 112 includes the credential manager 106 and a web browser application 114. The web browser 114 typically renders web page content, including log-in pages, and in connections utilizing secure protocols. The web browser 114 also receives site certificates, such as SSL certificates. The web browser 114 typically maintains or has access to a root certificate store that includes stored root certificates which identify known signers for particular certificates, e.g., SSL certificates. Where an SSL certificate is determined to not include a known signer based on the comparison with the known signer identified in the stored root certificates, the web browser 114 typically provides an alert notification to the user.

The web browser 114 may be any one of a number of conventional web browser applications, and the particular web browser application is not essential to this embodiment. Examples of web browser 114 applications include, but are not limited to, Microsoft® Internet Explorer, Mozilla® Firefox, and Google® Chrome. In one embodiment, the credential manager 106 executes in memory 112 as a separate application from the web browser 114. Alternatively, the credential manager 106 may operate as a plugin to the web browser 114.

The credential manager 106, in one embodiment, is configured to compare certificate credentials received from a web server 132 with corresponding stored certificate information obtained from a local trusted cache (not shown) and/or from a remote trusted source (e.g., certificate authority 140) for indications of malicious activity, such as a DNS redirect or a fraudulent local certificate. The credential manager 106, in one example, maintains a one or more entries of certificate information, where each entry includes certificate information associated with a particular SSL certificate.

The credential manager 106 of the client computing system 102 is configured to maintain copies of root certificates of the different certificate authorities 140a, 140b, etc. for signing the validation request sent to security manager 150. Although depicted herein are two certificate authorities, multiple different certificate authorities may exist. The root certificate may be an unsigned public key certificate, or a self-signed certificate that identifies a root certificate authority (e.g., certificate authority 140a, 140b). The legitimacy, or trustworthiness, of SSL certificates of websites are verified by the credential manager 106 from the response received in validation request sent to the trusted Certificate Authority (CA). The trust anchor, or base, is the root certificate authority.

The root certificate is the top most certificate that the certificate authority 140 issues. All subsequent SSL certificates inherit trustworthiness from the root certificate. The chain of trust, established by the credential manager 106, relies on the web browser 114 and the root certificates installed in the browser, and any intermediate certificate authorities that may have issued a certificate to a website being visited by the web browser 114. The most well-known root certificates (e.g., Comodo, DigiCert, Verisign, etc.) are distributed as part of the web browser 114.

Problems arise when a malicious entity compromises a certificate authority 140. The malicious entity may then issue certificates to web sites that appear to be authentic, and therefore trustworthy. For example, assume certificate authority 140b is compromised and has issued an SSL certificate for BankXYZ.com that traditionally uses certificate authority 140a for SSL certificates. If the malicious entity can redirect the web browser to a malicious website (easily accomplished with DNS redirection attacks, man-in-the-middle attacks, or tools available to perform man-in-the-middle attaches using SSL manipulation) the web browser 114 will trust the malicious website because the malicious SSL certificate appears to be valid and "rooted" in the certificate authority 140b.

Figure 2:
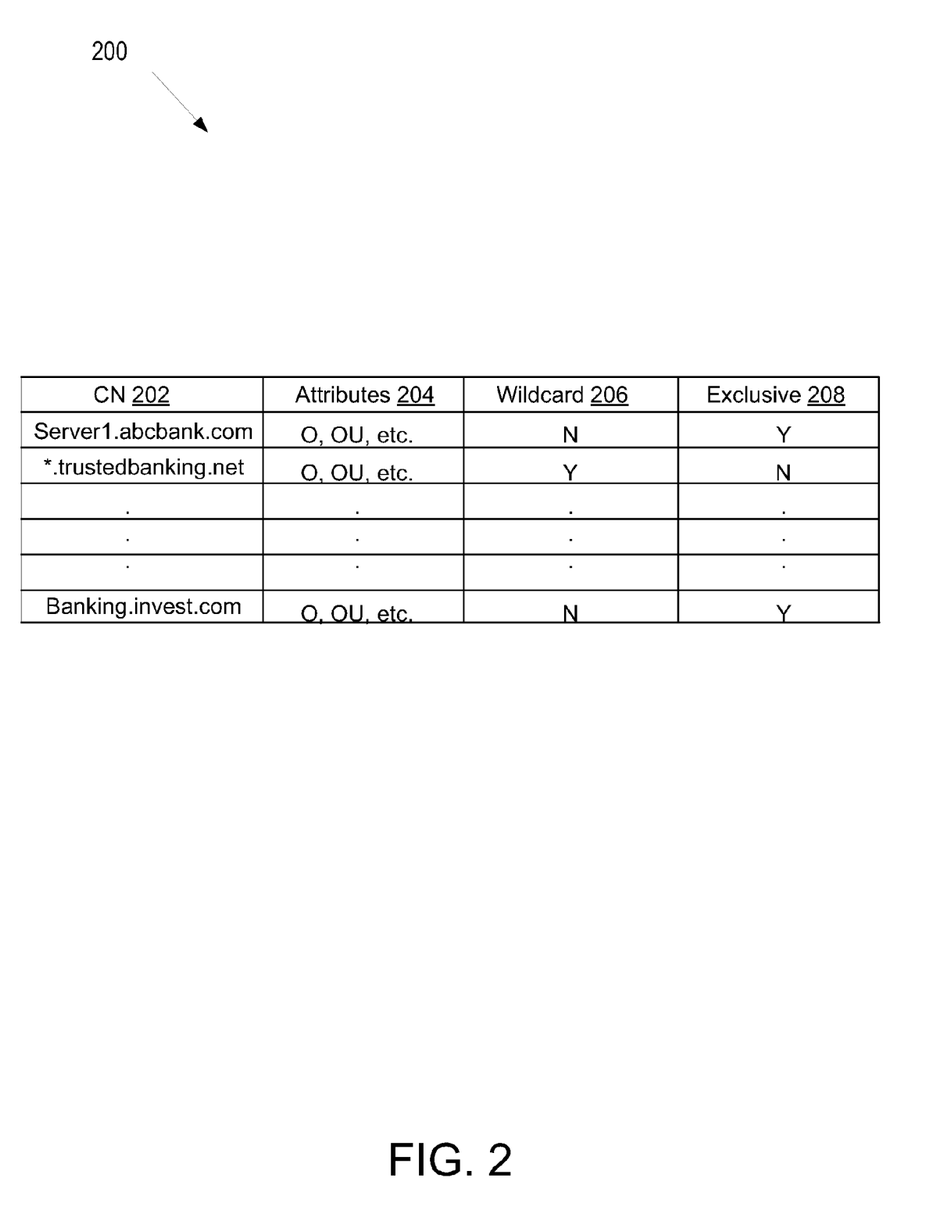
FIG. 2 is a block diagram illustrating one embodiment of entries maintained by the CA database.

To combat this scenario, and other similar situations, the credential manager 106 is configured to verify the signing authority of a particular website. Using the example of above, the credential manager 106, before trusting an SSL certificate of BankXYZ.com, may communicate with a security manager 150. The security manager 150 interfaces with the CA database 142 to identify the legitimate certificate authority for any particular website. The CA database 142 is configured to maintain entries, as described above, of websites that include certificate attributes (e.g., common name, organization, organizational unit, etc.), certificate is exclusive flag 208, and the trusted root certificate authority for the websites. As such, using the same example, the security manager 150 may perform a lookup of BankXYZ.com, determine that certificate authority 140b is not the certificate authority of BankXYZ.com based on the exclusive flag 208, and communicate with the credential manager 106 that the SSL certificate is malicious. In another embodiment, the security manager 150 returns a response based on a comparison of the root certificate authority retrieved (from the website certificate) and the credential manager 106 makes a determination regarding whether the SSL certificate is malicious or not without the exclusive flag 208.

In one embodiment, the credential manager 106 is configured to notify a certificate authority 140 when the credential manager detects a malicious SSL certificate. For example, when the credential manager 106 determines that an SSL certificate is illegitimately issued from a compromised certificate authority as its root certificate authority (e.g., the SSL certificate identifies certificate authority 140b instead of 140a), the credential manager identifies the proper certificate authority of the malicious activity.

FIG. 2 is a block diagram illustrating one embodiment of entries 200 maintained by the CA database 142 of FIG. 1. Each entry may correspond to an SSL certificate that corresponds to an URL. The CA database 142 may be configured to maintain information including, but not limited to the common name (CN) 202, certificate attributes 204, and indications whether the certificate is a wildcard 206 certificate and whether the certificate is exclusive 208. For example, in one embodiment, an entry in the CA database 142 includes certificate information for the URL, or CN 202, Server1.abcbank.com. The entry may include attributes 204 related to the certificate and an indication whether the certificate is a wildcard certificate. The attributes 204, in one embodiment, include an indication of the root certificate upon which the SSL certificate is based. A wildcard certificate refers to a certificate that applies to different subdomains. For example, a wildcard certificate for *.trustedbanking.net is configured to secure both www.trustedbanking.net and server1.trustedbanking.net. The exclusive 208 identifier is an indication of whether the SSL certificate is exclusive to the certificate authority 140 that is maintaining the CA database 142, or whether the SSL certificate is based upon another certificate authority 140.

Figure 3:
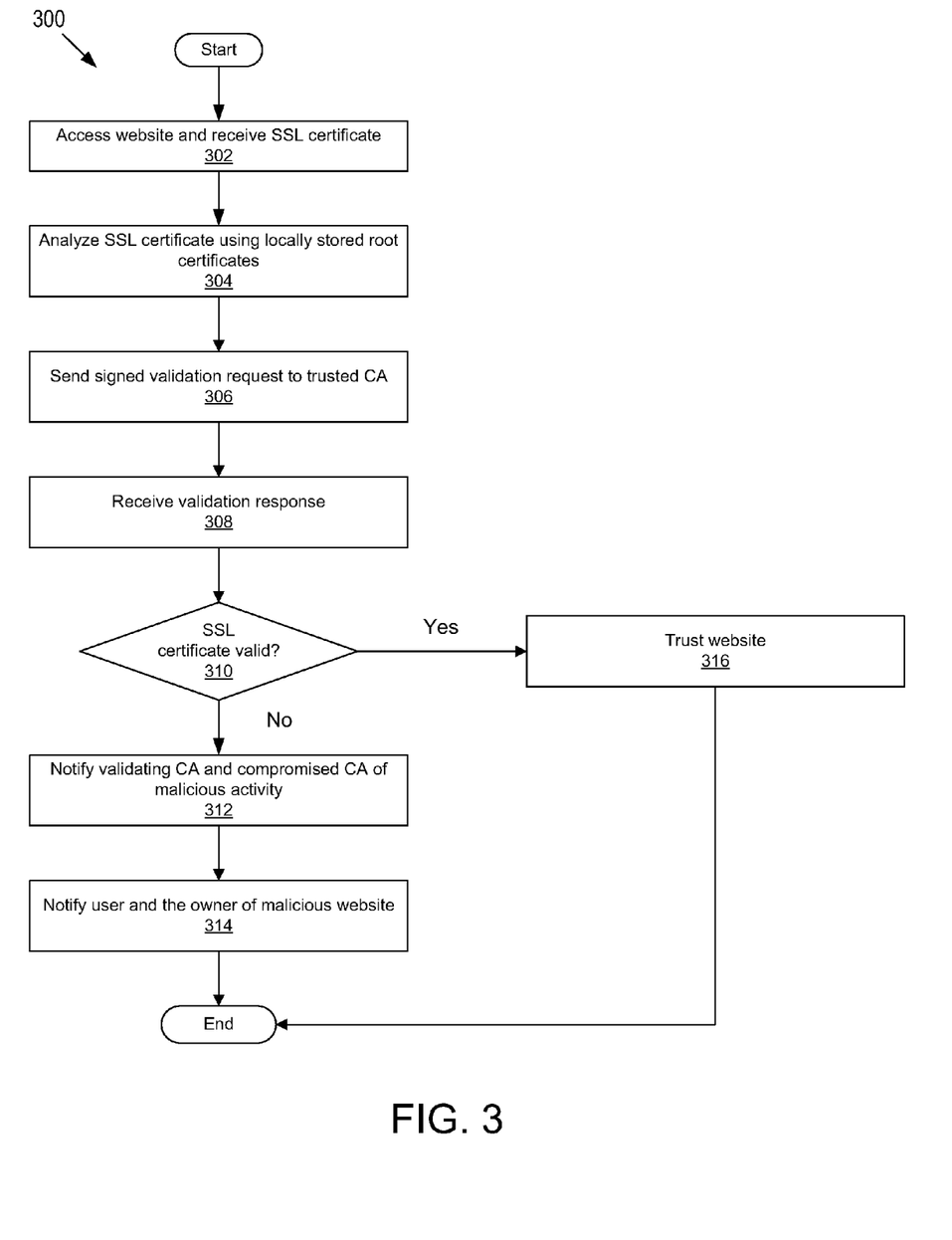
FIG. 3 is a flow diagram of one embodiment of a method of verifying the trustworthiness of SSL certificates.

FIG. 3 is a flow diagram of one embodiment of a method 300 of verifying the trustworthiness of SSL certificates. The method 300 is performed by processing logic that may comprise hardware (circuitry, dedicated logic, etc.), software (such as is run on a general-purpose computing system or a dedicated machine), or a combination of both. In one embodiment, the credential manager 106 performs the method 300. Alternatively, other components of client computing system 102 perform some or all of the method 300.

Referring to FIG. 3, processing logic begins method 300 by accessing, at block 302, a website and receiving an SSL certificate associated with that website. In one embodiment, the processing logic operates as a plugin to the web browser 114 of FIG. 1. The processing logic then, at block 304, analyzes the SSL certificate to determine the trustworthiness of the SSL certificate. In one example, the processing logic identifies the chain of trust of the SSL certificate. The processing logic determines if the chain of trust roots in a trusted root certificate stored in memory. In other words, the processing logic determines if the SSL certificate "chains" to a root certificate stored in the web browser 114.

At block 306, the processing logic generates and sends a signed validation request to a trusted certificate authority (e.g., certificate authority 140 of FIG. 1) to determine if the root certificate authority identified by the SSL certificate is deemed authentic root certificate authority. The processing logic, in one embodiment, generates the validation request and signs the validation request with a signing certificate that matches a signing certificate in use by the trusted certificate authority. Accordingly, the processing logic establishes trust with the trusted certificate authority.

At block 308, the processing logic receives a validation response from the security manager 150 of the trusted certificate authority 140. The validation response, in one embodiment, is similarly signed with the signing certificate to verify that the response has not been tampered with. The processing logic determines, at decision block 310, whether the SSL certificate is valid based on the response from the security manager 150. In one embodiment, the response from the security manager 150 contains an indication of the authentic or true root certificate authority for the SSL certificate. If the true root certificate authority matches the root certificate of the SSL certificate, then the SSL certificate is valid and the processing logic, at block 316, trusts the website. The above described method may also be applied to any intermediate certificate in the chain of trust.

If, however, the SSL certificate is not valid, the processing logic, at block 312, notifies the trusted certificate authority of the malicious activity. If the processing logic, after comparing certificate details with the details retrieved from the CA Database, finds that retrieved domain/website's exclusive identifier 208 is "Y" for the CA 140a (i.e., an indication that this website exclusively uses certificate from the trusted CA 140a), and finds that the CA name retrieved from the website certificate is not the trusted CA 140a, the processing logic sends a response indicating that the website's certificate is malicious and the corresponding CA may be compromised. Subsequently, the security manager collects, from the processing logic, this malicious activity information and notifies the trusted CA, 140a, the compromised CA 140b and other concerned parties.

The processing logic, in one embodiment, transmits information including, but not limited to, website name, invalid intermediate or root certificate name, IP address of client device (for determining geolocation), IP address of the malicious website, etc. The security manager, as will be discussed below, may utilize this information to analyze the malicious attack. At block 314, the processing logic notifies a user of the malicious website. In one embodiment, the processing logic notifies the user by presenting an alarm. The alarm may be a visual pop-up or an audible alarm. The method 300 then ends.

Figure 4:
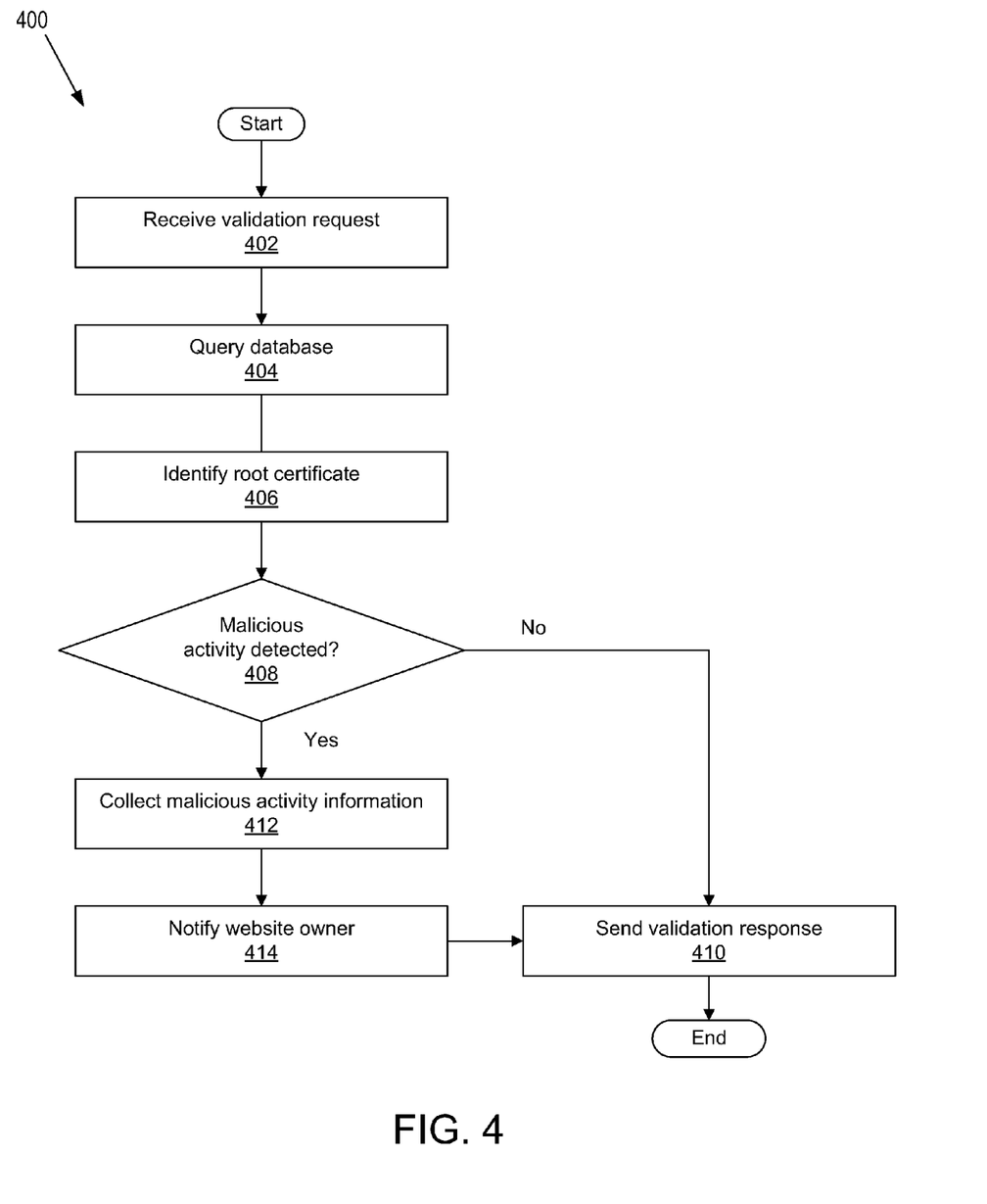
FIG. 4 is a flow diagram of one embodiment of a method of processing validation requests.

FIG. 4 is a flow diagram of one embodiment of a method of processing validation requests. The method 400 is performed by processing logic that may comprise hardware, software, or a combination of both. In one embodiment, the security manager 150 performs the method 400. Alternatively, other components of the certificate authority 104a perform some or all of the method 400.

Referring to FIG. 4, processing logic begins method 400 by receiving a validation request at block 402. In one embodiment, the processing logic receives a validation request by receiving a cryptographically signed validation request from a client device. In particular, the credential manager 106, via the web browser 114, may send a signed validation request. The processing logic, at block 404, queries the CA database to determine if the website associated with the validation request is present. The processing logic then, at block 406, identifies the root certificate associated with the SSL certificate of the validation request. In one embodiment, the processing logic may identify any intermediate certificate between the website certificate and the root certificate. Additionally, the processing logic may identify an entire chain of trust.

At block 408, the processing logic determines if any malicious activity is detected. The processing logic, in one embodiment, determines if any malicious activity is detected by determining if the identified root certificate of the validation request matches the true root certificate in the database. If no malicious activity is detected, the processing logic, at block 410, generates and sends a validation response that indicates that the chain of trust is trustworthy. In an alternative embodiment, the processing logic generates a response that contains the true root certificate authority (or other intermediate certificate authority) and allows the client device to make a determination of the trustworthiness of the SSL certificate.

In one embodiment, if the processing logic, after comparing certificate details with the details retrieved from CA Database, finds that the retrieved domain/website's exclusive identifier 208 is "Y" for CA 140a, indicating that this website exclusively uses certificate from a trusted CA 140a, and the CA name retrieved from website certificate is trusted CA 140a, the processing logic sends a response indicating the website's certificate is trusted, so no action is required.

In another embodiment, if the processing logic, after comparing certificate details with the details retrieved from CA Database, finds that retrieved domain/website's exclusive identifier 208 is N for CA 140a, indicating that the website exclusively uses certificate from a trusted CA 140a, but that the CA name retrieved from website certificate is not trusted CA 140a, the processing logic would not send any response indicating website's certificate is malicious.

If however, the processing logic determines, at block 408, that a malicious event has occurred with respect to the validation request, the processing logic collects, at block 412, malicious activity information. In one embodiment, the processing logic collects information regarding the client computing device, the website associated with the SSL certificate, IP addresses of both the client computing device and the website, the name of the root certificate authority associated with the malicious SSL certificate, etc. This information may be used by the processing logic to notify, at block 414, both the website owner and the root certificate authority that one or both may be compromised. The processing logic then, as described above, sends a validation response and the method 400 ends.

Figure 5:
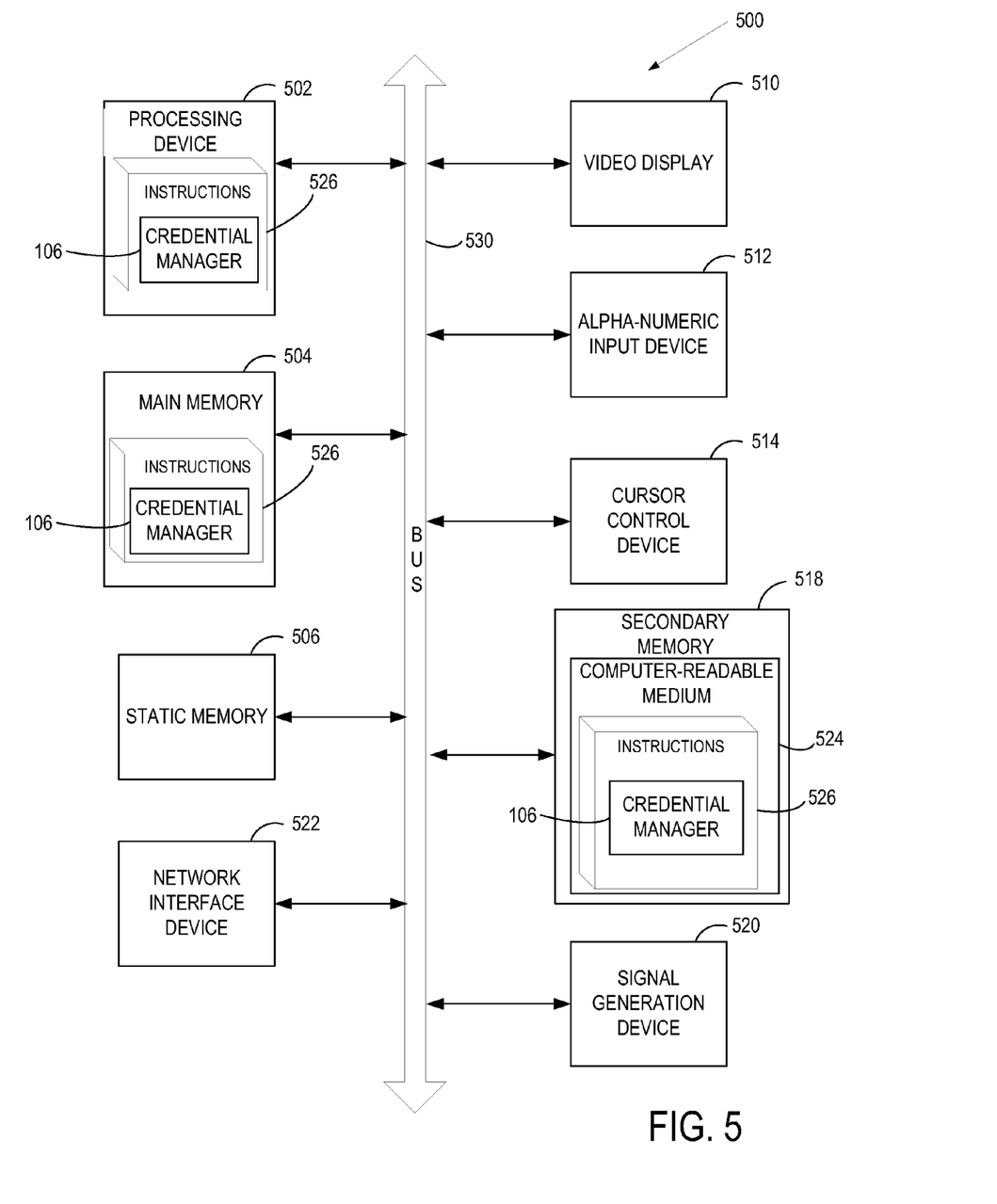
FIG. 5 illustrates a diagrammatic representation of a machine in the exemplary form of a computing system within which a set of instructions, for causing the machine to perform any one or more of the methodologies described herein, may be executed.

FIG. 5 illustrates a diagrammatic representation of a machine in the exemplary form of a computing system 500 within which a set of instructions, for causing the machine to perform any one or more of the methodologies discussed herein, may be executed. Within the computer system 500 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host in a cloud, a cloud provider system, a cloud controller or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a secondary memory 518 (e.g., a data storage device in the form of a drive unit, which may include fixed or removable computer-readable storage medium), which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 518 may include a machine-readable storage medium (or more specifically a computer-readable storage medium) 524 on which is stored one or more sets of instructions 526 embodying any one or more of the methodologies or functions described herein. In one embodiment, the instructions 526 include instructions for the credential manager 106 as described herein. The instructions 526 may also reside, completely or at least partially, within the main memory 504 and/or within the processing device 502 during execution thereof by the computer system 500, the main memory 504 and the processing device 502 also constituting machine-readable storage media.

The computer-readable storage medium 524 may also be used to store the instructions 526 persistently. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 526, components and other features described herein can be implemented as discrete hardware components or integrated in the functionality of hardware components such as ASICS, FPGAs, DSPs or similar devices. In addition, the instructions 526 can be implemented as firmware or functional circuitry within hardware devices. Further, the instructions 526 can be implemented in any combination hardware devices and software components.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "monitoring," "identifying," "generating," "providing," "selecting," "obtaining," "receiving," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a computing system programmed to perform the following, the method comprising:
receiving, by a credential manager at a client device, a secure sockets layer (SSL) certificate associated with a website;
identifying, at the client device, a chain of trust associated with the SSL certificate;
transmitting, to a security manager of a trusted certificate authority, a validation request based on the SSL certificate and a certificate in the chain of trust;
receiving a validation response from the security manager of the trusted certificate authority;
notifying the security manager that the SSL certificate is malicious when a root certificate of a true root certificate authority does not match a root certificate in the chain of trust associated with the SSL certificate;
transmitting identifying information to the security manager when the true root certificate does not match the root certificate of the chain of trust, wherein the identifying information comprises: an internet protocol (IP) address of the website, an IP address of the credential manager, a name of the true root certificate authority, and a name of the root certificate authority associated with the SSL certificate; and
presenting an indication of trustworthiness of the SSL certificate based on the validation response.

2. The method of claim 1, further comprising generating the validation request using a signing certificate that is common to the credential manager and the security manager.

3. The method of claim 1, wherein the validation response further comprises an indication that a root certificate authority associated with the SSL certificate is valid.

4. The method of claim 1, further comprising notifying the true root certificate authority and the root certificate authority associated with the SSL certificate when the true root certificate does not match the root certificate of the chain of trust.

5. The method of claim 1, further comprising preventing a web browser application from accessing the website when the true root certificate does not match the root certificate of the chain of trust.

6. A computing system comprising:
a memory; and
a processor coupled with the memory, the processor to execute a credential manager, wherein the credential manager is to:
receive a secure sockets layer (SSL) certificate associated with a website;
identify a chain of trust associated with the SSL certificate;
transmit, to a security manager of a trusted certificate authority, a validation request based on the SSL certificate and a certificate in the chain of trust;
receive a validation response from the security manager of the trusted certificate authority, wherein the validation response further comprises an indication that a root certificate authority associated with the SSL certificate is valid;
present an indication of trustworthiness of the SSL certificate based on the validation response;
notify the security manager that the SSL certificate is malicious when a true root certificate does not match the certificate of the chain of trust associated with the SSL certificate; and
transmit identifying information to the security manager when the true root certificate does not match the certificate of the chain of trust, the identifying information comprising an internet protocol (IP) address of the website, an IP address of the credential manager, a name of a true root certificate authority, and a name of the root certificate authority associated with the SSL certificate.

7. The computing system of claim 6, wherein the credential manager is further to generate the validation request using a signing certificate that is common to the credential manager and the security manager.

8. The computing system of claim 6, wherein the credential manager is further to notify a true root certificate authority and the root certificate authority associated with the SSL certificate when the true root certificate does not match the root certificate of the chain of trust.

9. The computing system of claim 6, wherein the credential manager is further to prevent a web browser application from accessing the website when the true root certificate does not match the root certificate of the chain of trust.

10. A non-transitory computer readable storage medium including instructions that, when executed by a processor, cause the processor to perform operations comprising:
receiving, by a credential manager at a client device, a secure sockets layer (SSL) certificate associated with a website;
identifying, at the client device, a chain of trust associated with the SSL certificate;
transmitting, to a security manager of a certificate authority, a validation request based on the SSL certificate and a certificate in the chain of trust;
receiving a validation response from the security manager of the certificate authority;
notifying the security manager that the SSL certificate is malicious when a true root certificate does not match a root certificate of the chain of trust;
transmitting identifying information to the security manager when the true root certificate does not match the root certificate of the chain of trust, the identifying information comprising an internet protocol (IP) address of the website, an IP address of the credential manager, a name of the root certificate authority, and a name of a valid root certificate authority;
presenting an indication of trustworthiness based on the validation response.

11. The non-transitory computer readable storage medium of claim 10, wherein the operations further comprises generating the validation request using a signing certificate that is common to the credential manager and the security manager.

12. The non-transitory computer readable storage medium of claim 10, wherein the validation response further comprises an indication that a root certificate authority associated with the SSL certificate is valid.

13. The non-transitory computer readable storage medium of claim 10, wherein the operations further comprises notifying the security manager when the true root certificate does not match the root certificate of the chain of trust.

* * * * *